US010691185B2

United States Patent
Huang et al.

(10) Patent No.: US 10,691,185 B2
(45) Date of Patent: Jun. 23, 2020

(54) COOLING BEHAVIOR IN COMPUTER SYSTEMS

(71) Applicant: QUANTA COMPUTER INC., Taoyuan (TW)

(72) Inventors: Chih-Chia Huang, Taoyuan (TW); Hao-Yu Chan, Taoyuan (TW); Tsai-I Yen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 107 days.

(21) Appl. No.: 15/886,418

(22) Filed: Feb. 1, 2018

(65) Prior Publication Data

US 2019/0235592 A1     Aug. 1, 2019

(51) Int. Cl.
*G06F 1/32*      (2019.01)
*G06F 1/20*      (2006.01)
*G06F 1/3287*    (2019.01)
*G06F 1/3203*    (2019.01)

(52) U.S. Cl.
CPC .......... *G06F 1/206* (2013.01); *G06F 1/3287* (2013.01); *G06F 1/3203* (2013.01)

(58) Field of Classification Search
CPC ............................... G06F 1/206; G06F 1/3287
USPC ....................................................... 713/324
See application file for complete search history.

(56) References Cited

U.S. PATENT DOCUMENTS

| | | | | |
|---|---|---|---|---|
| 6,215,845 B1* | 4/2001 | Knigge | ................. | G01N 23/02 378/57 |
| 7,132,809 B1* | 11/2006 | Chang | ................ | H05K 7/20209 318/400.13 |
| 2003/0063437 A1* | 4/2003 | Kurihara | ................. | G06F 1/206 361/688 |
| 2006/0181232 A1* | 8/2006 | Oljaca | .................... | G06F 1/206 318/268 |
| 2007/0200518 A1* | 8/2007 | Verge | ................. | H05K 7/20209 318/268 |
| 2008/0088268 A1* | 4/2008 | Sakaguchi | ............ | F04D 27/004 318/471 |
| 2008/0170576 A1* | 7/2008 | Arroyo | ............... | H04L 67/1097 370/395.52 |
| 2010/0246049 A1* | 9/2010 | Tsai | .................... | G11B 17/0436 360/71 |
| 2012/0123597 A1* | 5/2012 | Cepulis | ................... | G06F 1/206 700/282 |
| 2012/0324088 A1* | 12/2012 | Zhou | .................... | H04L 67/125 709/223 |
| 2013/0058794 A1* | 3/2013 | Lin | ....................... | F04D 27/004 417/42 |
| 2013/0249455 A1* | 9/2013 | Chiu | ....................... | H02P 27/06 318/400.13 |
| 2013/0336805 A1* | 12/2013 | Shibata | ................. | F04D 27/004 417/44.1 |
| 2014/0142764 A1* | 5/2014 | Chen | .................. | H05K 7/20209 700/276 |

(Continued)

*Primary Examiner* — Volvick Derose
(74) *Attorney, Agent, or Firm* — Nixon Peabody LLP (57) ABSTRACT

Systems and methods are described for improved cooling behavior in computer systems using fan-based cooling systems. In particular, the systems and methods utilize two types of techniques can be used for providing improved cooling behavior: hardware-based techniques and software-based techniques. These techniques can be used separately or in combination.

10 Claims, 8 Drawing Sheets

(56) References Cited

U.S. PATENT DOCUMENTS

| | | | |
|---|---|---|---|
| 2014/0346993 A1* | 11/2014 | Mishima | H05K 7/20209 |
| | | | 318/400.38 |
| 2016/0076544 A1* | 3/2016 | Fan | F04D 27/004 |
| | | | 700/275 |
| 2016/0227683 A1* | 8/2016 | Nakajima | H05K 13/08 |
| 2017/0187310 A1* | 6/2017 | Hung | H02P 7/29 |

* cited by examiner

COOLING BEHAVIOR IN COMPUTER SYSTEMS

FIELD OF THE INVENTION

The present disclosure relates to computer system, and more specifically to systems and methods for controlling cooling behavior in computer systems.

BACKGROUND

In any type of computer system, management of temperature during operation is a primary concern. Improper management of temperature can lead to unstable operation of the computer system and, in a worst case, to damage to the computer system. As a result, a computer system is typically designed with one or more cooling systems to ensure proper management of temperature in the computer system. One typical type of cooling system utilized in computer systems is a fan-based ventilation system. An example of a computer system incorporating a fan-based cooling system is illustrated in FIG. 1.

Figure 1:
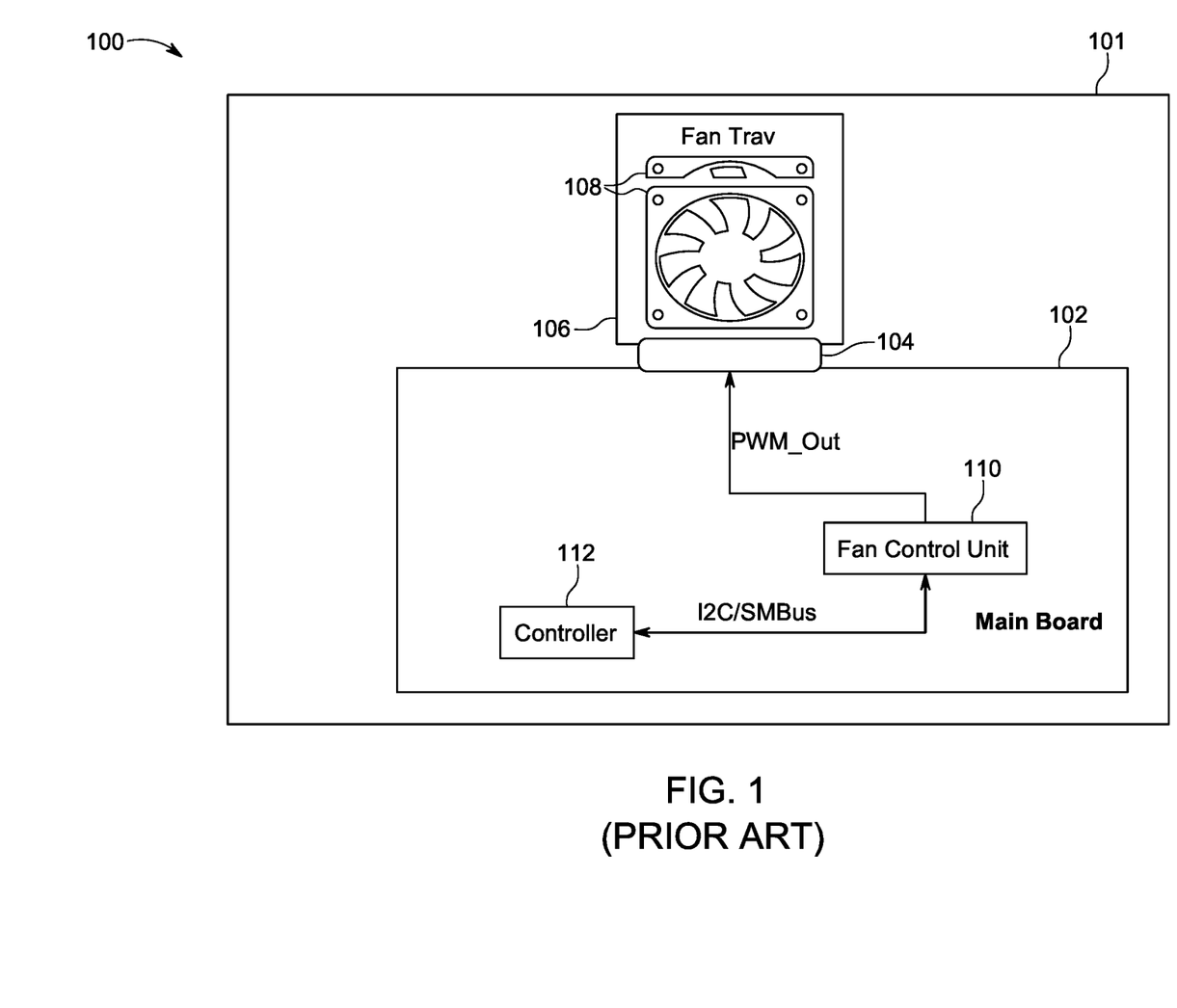
FIG. 1 is an illustration of a conventional computer system 100 incorporating a fan-based cooling system that is useful for describing the various embodiments.

FIG. 1 is an illustration of a conventional computer system 100 incorporating a fan-based cooling system. As shown in FIG. 1, the computer system 100 includes a chassis 101 for housing the various components of the computer system 100. The various components in computer system 100 can vary depending on the type of tasks computer system 100 is configured to perform, but generally include at least a main board 102. The main board 102 can include the operational components. For example, the operational components can include processor devices, memory devices, or any other devices required for the computer system 100 to perform the tasks it is designed for.

For purposes of cooling, the computer system 100 can include at least one fan tray 106 including one or more fans 108, as shown in FIG. 1. The fan tray 106 can be, for example, a removable fan module including the one of the fans 108. Alternatively, the fan tray 106 can be a board or other structure configured to receive one or more removable fan modules including the one of the fans 108. The fan tray 106 (and thus fans 108) can be coupled to the main board 102. For example, as shown in FIG. 1, a connector 104 can be provided to connect the fan tray 106 to the main board 102. Connector 104 can be associated with a fan slot (not shown) in chassis 101 for receiving the fan tray 106. In such a configuration, insertion of the fan tray 106 into fan slot can also result in fan tray 106 engaging connector. However, in other configurations, the fan tray 106 may have a cable (not shown) to insert into connector.

In addition to the fan tray 106, the computer system 100 can also include components for controlling the fan. For example, as shown in FIG. 1, the computer system 100 can also include a fan control unit 110. The fan control unit 110 can be configured to generate the necessary signals (PWN_out) at connector 104 to operate the fans 108 with a desired duty cycle. In some cases, the fan control unit 110 can be designed to operate autonomously. For example, the fan control unit 110 can receive data from one or more temperature sensors (not shown) in computer system 100 and adjust the duty cycle for the fans 108 accordingly.

In other cases, the operation of fan control unit 110 can be coordinated with other fan control units controlling other fan trays in computer system 100. In these cases, the computer system 100 can include, as shown in FIG. 1, a system controller 112 coupled to fan control unit 110 and other fan control units. For example, the system controller 112 can be coupled via an I2C/SMBus to the fan control unit 110, as well as any other fan control units in computer system 100. In operation, the system controller 112 can receive sensor data or other data from various parts of computer system 100 and generate appropriate signals for fan control unit 110 and other fan control units in computer system.

While the configuration of FIG. 1 provides rudimentary temperature management in computer system 100, this configuration cannot deal with certain types of errors, failures, and other events typically encountered. For example, failures or errors in the system controller 112 or the fan control unit 110 are not addressed by the configuration of FIG. 1. Further, the configuration of FIG. 1 does not provide a way to manage temperature during the hot-swap of components, including fans.

SUMMARY

The various embodiments concern systems and methods for controlling cooling behaviors in computer systems. Certain embodiments are concerned with computing devices. In these first embodiments, the computing devices can include a fan connector and a fan control unit. Additionally, these computing devices can include a system controller coupled to the fan control unit, and an arbitrator circuit coupling the fan control unit to the fan connector. In these embodiments, the system controller is configured to generate a first control signal for the fan control unit. In response, the fan control unit is configured to generate two fan control signals: (1) a first fan control signal based on the first control signal; and (2) a second fan control signal autonomously. In operation, the arbitrator circuit of these computing devices is configured to monitor an operational status of the system controller. Based on that operational status, the arbitrator circuit then selects one of the first fan control signal or the second fan control signal as a final control signal for the fan connector. This final fan control signal can be a pulse-width modulation (PWM) signal.

In some implementations of the computing device, the fan control unit is configured to monitor at least one temperature. The fan control unit can then generate the second fan control signal based on this temperature.

The arbitrator circuit can, in some embodiments, be configured to receive a third fan control signal. In these implementations, the arbitrator circuit is configured to monitor an operational status of the fan control unit. If the operational status of the fan control unit is abnormal, the arbitrator circuit selects the third fan control signal as the final fan control signal.

The system controller can, in some embodiments, be configured to generate an operational status signal for the arbitrator circuit. In response, the arbitrator circuit can determine the operational status of the system controller based on this operational status signal.

In particular implementations of the computing device, the computing device can also include a status detection circuit. Further, the system controller can be configured to transmit an initial operational status signal to the status detection circuit. In response to the initial operational status signal, the status detection circuit can generate a final operational status signal for the arbitrator circuit. Thereafter, the arbitrator circuit can determine the operational status of the system controller based on this final operational status signal. In some implementations, the final operational status signal can be a heartbeat signal.

Second embodiments are concerned with computer-implemented methods for controlling a fan in a computing device. These methods can include the step of ascertaining an operational status of a system controller. In general, the operational status would be one of a normal status or an abnormal status. The methods also include the step of controlling the fan in a first way when the operational status of the system controller is the normal status. In particular, using a first fan control signal generated at a fan control unit based on a first control signal from the system controller. The methods also include the step of controlling the fan in a second way when the operational status of the system controller is the abnormal status. In particular, using a second fan control signal autonomously generated at the fan control unit.

In some implementations of the methods, the second fan control signal is autonomously generated at the fan control unit based on at least one temperature being measured in the computing device.

The methods can also include the steps of detecting that an operational status of a fan control unit is an abnormal status. The methods can further include the step of controlling the fan using a third fan control signal generated outside of the fan control unit, after detecting the abnormal status of the fan control unit.

The methods can also include the steps of receiving a heartbeat signal from the system controller, and determining the operational status of the system controller based on this heartbeat signal.

Third embodiments are concerned with methods for controlling operation of a computing device having a plurality of fans and a plurality of sleds in a plurality of slots. These methods can include the step of ascertaining a total number of components of a component type currently inoperative or missing from the computing device. Further, these methods can include the step of determining whether that total number meets a threshold number for the component type. Additionally, the methods can include powering off the sleds when the total number meets the threshold number for the component type. In these embodiments, the component type can be a fan tray or a type of sled.

In cases where the component type is the type of sled, the method can also include the step of controlling the plurality of fans. In particular, the fans can be controlled according to a predefined temperature table.

In some cases where the component type is the type of sled, the type of sled can be a line card sled or a fabric card sled.

The methods of the third embodiments can also include the step of detecting a number of errors, or an error type, in the plurality of slots. These methods can also include the step of determining whether the number of errors meets a threshold number for the error type. Additionally, these methods can also include configuring the plurality of fans with an elevated duty cycle when the number or errors meets the threshold number for the error type. In some cases, the error type can be controller failures across the plurality of sleds; thermal failures across the plurality of slots; and thermal failures in one of the plurality of slots.

In certain cases, the methods of the third embodiments concern a computing device in which the plurality of fans is disposed in a plurality of fan trays. Further, the plurality of fan trays is associated with a plurality of fan zones. In such cases, the methods can also include the step of detecting that one of the fan trays in one of the fan zones has been removed. The methods can also include increasing a duty cycle for at least one of the other of the plurality of fan trays in the one fan zone.

The methods of the third embodiments can include the steps of detecting a failure of in one of the plurality fan zones. The methods can also include the step of increasing a duty cycle for other pluralities of fans in the one fan zone.

DETAILED DESCRIPTION

The various embodiments are described with reference to the attached figures, wherein like reference numerals are used throughout the figures to designate similar or equivalent elements. The figures are not drawn to scale, and they are provided merely for illustrative purposes. It should be understood that numerous specific details, relationships, and methods are set forth to provide a full understanding of the various embodiments. One having ordinary skill in the relevant art, however, will readily recognize that the various embodiments can be implemented without one or more of the specific details described herein, or with other methods not described herein. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events. Furthermore, not all illustrated acts or events are required to implement the various embodiments.

As discussed above, there are several issues in computer systems implementing fan-based cooling systems. In view of these issues, the various embodiments provide systems and methods for providing improved cooling behavior in computer systems using fan-based cooling systems. The systems and methods of the various embodiments are directed to two types of techniques for providing improved cooling behavior—hardware-based techniques and software-based techniques. However, the various embodiments are not limited to one type of technique. Rather, a combination of hardware and software techniques can be used in the various embodiments.

Figure 2:
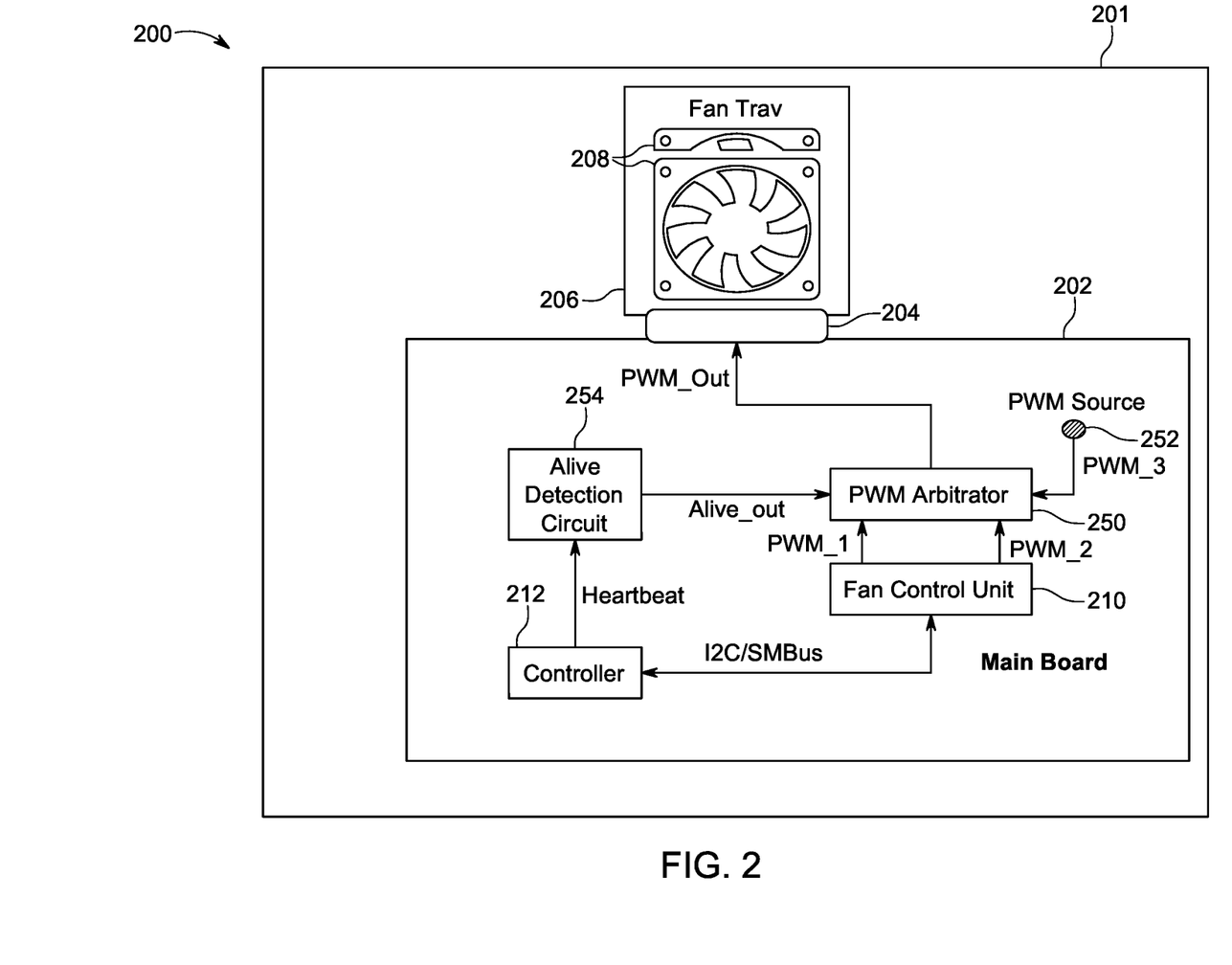
FIG. 2 is an illustration of a computer system incorporating a fan-based cooling system with hardware-based control in accordance with the various embodiments.

As noted above, in some embodiments, a hardware-based technique can be used. This is illustrated in FIG. 2. FIG. 2 is an illustration of a computer system 200 incorporating a fan-based cooling system with hardware-based control in accordance with the various embodiments. The configuration of system 200 in FIG. 200 is substantially similar to the configuration of system 100 in FIG. 1. Accordingly, the description of components 101, 102, 104, 106, 108, 110, and 112 with respect to FIG. 1 is sufficient for describing components 201, 202, 204, 206, 208, 210, and 212 in FIG. 2, except where noted below. Further, as noted above with respect to computer system 100 in FIG. 1, computer system 200 in FIG. 2 may include additional fan control units also controlled by system controller 212. Each of these additional fan control units can generate fan control signals for additional fans in computer system 200. Additionally, although not shown, system 200 may include additional components, buses, and circuits to provide interconnection of the various components described herein.

As noted above, one of the problems with computer system 100 in FIG. 1 is that there is typically no way to manage certain types of failures, such as a failure in system controller 112 or fan control unit 110. The configuration of computer system 200 in FIG. 2 addresses these issues.

To address the issue of a failure in system controller 212, the computer system 200 is configured to be able to provide an alternate control signal at connector 204. This capability is provided by the incorporation of arbitrator circuit 250 and reconfiguration of the fan control unit 210. First, as shown in FIG. 2, the fan control unit 210 is configured to concurrently output two fan control signals (PWM_1, PWM_2) to arbitrator circuit 250. These signals can be pulse-width modulated (PWM) signals indicating a duty cycle for the fans 208.

The first fan control signal (PWM_1) is generated by the fan control unit 210 based on the signal received from the system controller 212. As noted above, the first fan control signal reflects the efforts by the system controller 212 to coordinate the operation of the fan control unit 210 with any other fan control units in computer system 200. In contrast, the second fan control signal (PWM_1) is autonomously generated by the fan control unit 210. That is, as discussed above, the fan control unit 210 can generate this signal based one temperature data or other data received at the fan control unit 210.

The arbitrator circuit 250 is configured to select between the two fan control signals generated by the fan control unit 210, so as to provide a final fan control signal (PWM_out) at connector 204. In particular, the arbitrator circuit 250 monitors the operation of the controller 212, and makes a selection based on the operational status of the system controller 212. For example, if the arbitrator circuit 250 detects that the system controller 212 is online and functioning properly (i.e., normal operation), the arbitrator circuit 250 selects the first fan control signal (PWM_1) generated by the fan control unit 250, in response to control signals from the system controller 212. In contrast, if the arbitrator circuit 250 detects that the system controller 212 is offline, hung up, or otherwise functioning improperly (i.e., abnormal operation), the arbitrator circuit 250 can select the second fan control signal (PWM_2) autonomously generated by the fan control unit 250.

Detection of normal and abnormal operation can be performed in a variety of ways. In one exemplary configuration, as shown in FIG. 2, the arbitrator circuit 250 can receive a status signal (Alive_out) indicating the status from the system controller 212. This status signal can be as simple as a digital signal received at a single pin of the arbitrator circuit 250. The digital signal can be configured as a "1" during normal operation and a "0" during abnormal operation. The arbitrator circuit 250 can then evaluate the received digital signal, and make an appropriate selection between the fan control signals from fan control unit 210. However, the various embodiments are not limited in this regard. In other embodiments, multiple signals can be provided to arbitrator circuit 250.

In some configurations, the status signal can be generated at system controller 212 and provided directly to arbitrator circuit 250. However, such a configuration has the disadvantage that if the system controller 212 is stuck or hung up, the status signal may incorrectly indicate normal operation at the system controller 212. Therefore, in other configurations, the system controller 212 can instead be configured to generate a heartbeat signal. That is, the system controller 212 generates a time varying signal during normal operation, e.g., a series of pulses. In some configurations, the arbitrator circuit 250 can be configured to include circuitry to detect such a heartbeat signal, and make a determination of the status of the system controller 212 based on this heartbeat signal. In other configurations, as shown in FIG. 2, there can be provided an external circuit, such as alive detection circuit 254. As shown in FIG. 2, the alive detection circuit 254 can be configured to receive the heartbeat signal from the system controller 212. The alive detection circuit 254 can then be configured to generate the status signal (Alive_out or other alive signal) for arbitrator circuit 210.

To address the issue of a failure in fan control unit 210, the computer system 200 is configured to select an alternate or emergency control signal for connector 204. This capability is provided by the configuring the arbitrator circuit 250 to have access to a fan control signal other than those generated by the fan control unit. For example, PWM source 252 can provide an alternate fan control signal (PWM_3). Further, the arbitrator circuit 250 is also configured to detect an operational status of the fan control circuit 210 and select the fan control signal based on this operational status.

In operation, if the arbitrator circuit 250 detects that the fan control circuit 210 is online and functioning properly (i.e., normal operation). In this case, the arbitrator circuit 250 selects one of the fan control signals generated by the fan control unit 250 based on the operational status of the system controller 212, as previously discussed. In contrast, if the arbitrator circuit 250 detects that the fan control unit is offline, hung up, or otherwise functioning improperly (i.e., abnormal operation), the arbitrator circuit 250 can select the fan control signal (PWM_3) available from PWM source 252.

Detection of normal and abnormal operation of fan control unit 210 can be performed in a variety of ways. In one exemplary configuration, as shown in FIG. 2, the arbitrator circuit 250 can a receive status signal from the fan control unit 210. This status signal can be as simple as a digital signal received at a single pin of the arbitrator circuit 250. The digital signal can be configured as a "1" during normal operation and a "0" during abnormal operation. The arbitrator circuit 250 can then evaluate the received digital signal and make an appropriate selection between the fan control signals from fan control unit 210 and PWM source 252. In another configuration, an arrangement similar to that discussed above with respect to the system controller 212 can be used. That is, the fan control unit 210 can generate a heartbeat signal that is used by some detection circuit to generate a status signal for arbitrator circuit 250. In certain embodiments, the alive detection circuit 254 can be configured to receive heartbeat signals from both the system controller 212 and the fan control unit 210. The alive detection circuit 254 can then generate and forward status signals for each of the system controller 212 and the fan control unit 210.

In the various embodiments, the PWM source 252 can be provided in a variety of ways. For example, PWM source 252 can be circuit providing a pre-defined PWM signal in some embodiments. In some cases, the PWM source 252 can be a circuit providing constant voltage so as to cause a 100% duty cycle. Alternatively, the PWM source 252 can be a circuit providing a pre-defined sequence of pulses defining some other duty cycle. In other embodiments, the PWM source 252 can be another fan control unit in computer system 200. For example, another fan control unit associated with another fan tray adjacent to fan tray 206. However, the various embodiments are not limited to any particular configuration for PWM source 252.

As noted above, the various embodiments are not limited to hardware-based control. Rather, in some embodiments a software-based technique can be used, separately or in combination with hardware based techniques.

Figure 3:
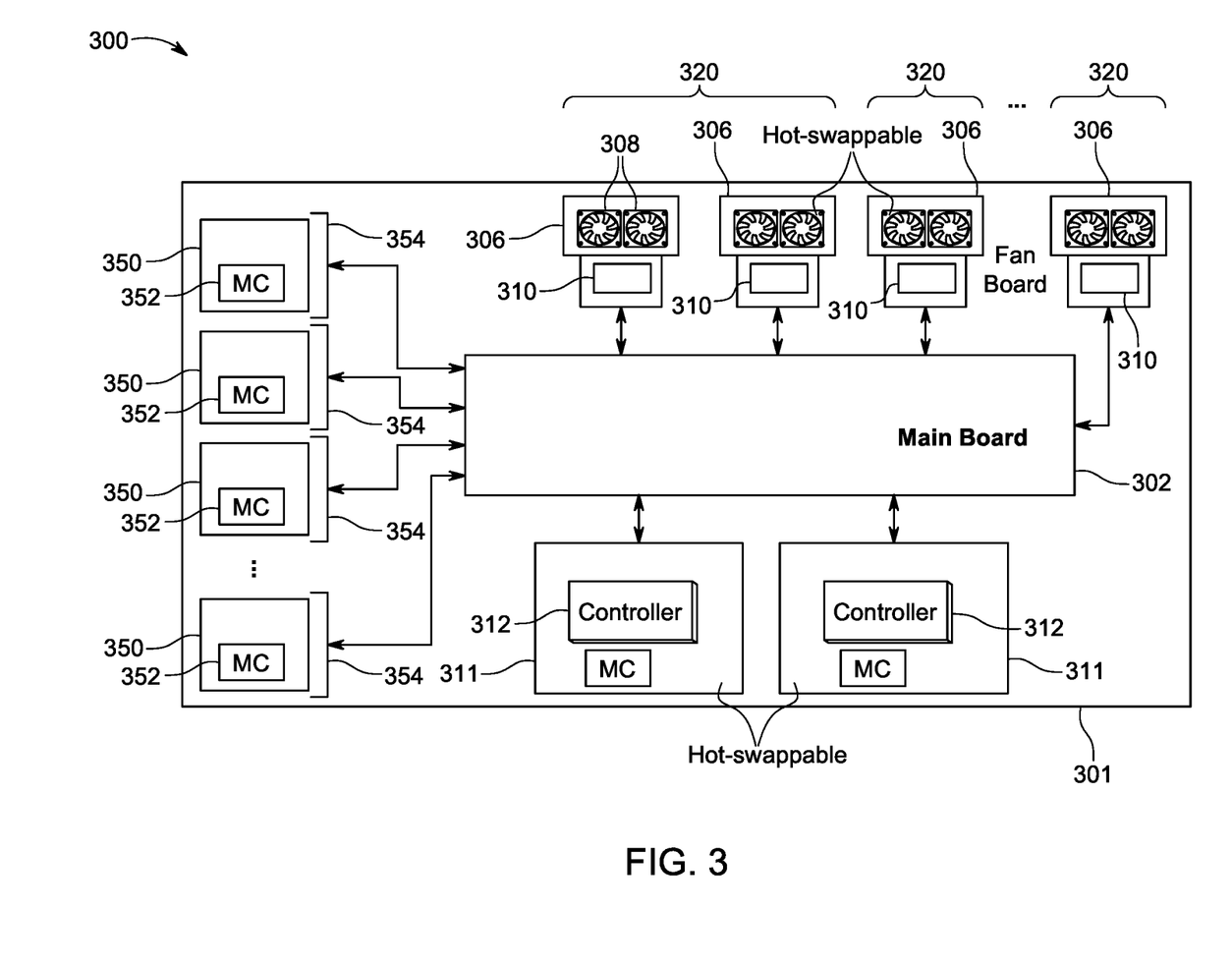
FIG. 3 is an illustration of a computer system incorporating a fan-based cooling system with software-based control in accordance with the various embodiments.

Prior to discussing the software-based techniques, it may be useful to discuss other aspects of some types of computer systems. These are discussed below with respect to FIG. 3. FIG. 3 is an illustration of a computer system 300 incorporating a fan-based cooling system with software-based control in accordance with the various embodiments.

The configuration of system 300 in FIG. 300 is substantially similar to the configuration of system 100 in FIG. 1. Accordingly, the description of components 101, 102, 106, 108, 110, and 112 with respect to FIG. 1 is sufficient for describing components 301, 302, 306, 308, 310, and 312 in FIG. 3, except where noted below. Further, although not shown, system 300 may include additional components, buses, and circuits to provide interconnection of the various components described herein.

In addition to the above-identified components, computer system 300 is illustrated in FIG. 3 with additional components. For example, as shown in FIG. 3, computer system 300 can include a plurality of sleds 350, each insertable into a sled slot 354 of computer system. The plurality of sleds 350 can be configured to support processing of any type of tasks. Further, each of the sleds can include a management controller (MC) 352 for performing out-of-band management of the sleds 350. In particular embodiments, the plurality of sleds 350 can be switch line cards and switch fabric cards to as to configure computer system 300 as a switch. However, the various embodiments are not limited in this regard, and any other types of sleds can be used in system 300.

Additionally, computer system 300 is configured with an organization of the fan trays 306. In particular, as shown in FIG. 3, the fan trays 306 can be organized in a plurality of fan zones 320. In certain embodiments, the fan zones 320 can be associated with particular ones of sled slots 354. That is, each of fan zones 320 may be associated with one or more sled slots 354 and thus with one or more of associated sleds 350.

For purposes of controlling the fan trays 306 in the various fan zones, computer system 300 can also include one or more monitor cards 311, each containing a system controller 312, as shown in FIG. 3. In some cases, the monitor cards 311 can be hot-swappable. Further, Each of the monitor cards 311 can be associated with one or more of the fan zones 320. The system controller 312 associated with a monitor card 311 operates as the system controller for the fan trays 306 in an associated one of fan zones 320. Thus, each of system controllers 312 can operate in a manner similar to that of system controllers 112 in FIG. 1 or system controller 212 in FIG. 2. Additional functions of the system controllers 312 in each of the monitor cards 311 are described below.

In some embodiments, multiple monitor cards 311 can be provided in computer system 300—each associated with a different portion of the fan zones 320. In other embodiments, the monitor cards 311 can include one or more primary monitor cards and one or more backup cards. Thus, when one of the monitor cards 311 fails or is removed, its functions can be taken over by one of the other monitor cards 311.

FIG. 3 also shows fan control units 310 as being separate from main board 302 and part of one of corresponding fan trays 306. However, in other configurations, the fan control units 310 can be incorporated into main board 302, and provide a similar configuration as in FIG. 1 for the fan control units 310 and associated fan trays 306. Alternatively, the fan control units 310 can be incorporated into one or more daughterboards coupled to the main board 302. In turn, the fan trays 306 can be coupled to corresponding fan control units 310 on such daugtherboards.

As noted above, one of the problems with computer system 100 in FIG. 1 is that there is typically no way to manage certain types of events, such as the removal of components or fan failures. The configuration of computer system 300 in FIG. 3 addresses these issues.

In particular, the monitor cards 311 (using a corresponding of system controllers 312) in the various embodiments are configured to monitor the status of components and fan and take appropriate action.

In some embodiments, a monitor card 311 (via system controller 312) can monitor the number of sleds 350 currently inserted or the number of fan trays 306 currently inserted. The number of components can be monitored on an overall basis or a zone-by zone basis. In the case of sleds 350, if a large number is removed, this can significantly affect airflow in the chassis 301. In some cases, this can result in any airflow generated by the fan trays 306 being ineffective. In the case of fan trays 306, if a large number is removed, then insufficient ventilation may be provided in chassis 301. In either case, a monitor card 311 (via system controller 312) may determine that chassis ventilation is compromised. Thus, to protect system 300 from overheating or thermal damage, the monitor card 311 (via system controller 312) may shut down the sleds 350. Optionally, the fan trays 306 may be operated with a duty cycle designed to cool down chassis 301 as soon as possible.

In other embodiments, the monitor card 311 (using system controllers 312) can also be configured to monitor errors or abnormal behaviors in the fan trays 306 or the sleds 350. This can be accomplished via communications via an I2C bus or a LAN interface. Thus, if the number of errors or instances of abnormal behavior exceeds some threshold, appropriate corrective action can be taken by the monitor card 311 (via system controller 312). For example, the monitor card 311 (via system controller 312) can be used to monitor the operational status of the MCs 352 in each of the sleds 350 (overall or in an associated one of fan zones 320). If a large number of the MCs 352 appear to failing or are otherwise offline, this can indicate that a system controller 312 in the monitor card 311 is not receiving the correct information needed for setting fan speeds correctly. In such a situation, the monitor card 311 (via its system controller 312) can be configured to increase fan speed as a precaution. In another example, the number of thermal failures in the sleds 350 and the slots 354 can be monitored. If a sufficiently large number of thermal failures is detected, then this is indicative of a cooling issue. In such a situation, the monitor card 311 (via its system controller 312) can again be configured to increase fan speed as a precaution.

In still other embodiments, the monitor card 311 (via system controller 312) can also be used to maintain, monitor, and protect the status and operation of the fan trays 306 and the fans 308. Thus, if the monitor card 311 detects certain scenarios, appropriate corrective action can be taken by the monitor card 311 (via system controller 312) to protect the computer system. For example, if a failure of one of the fan trays 306, or even one of the fans 308, is detected, the monitor card 311 (via its system controller 312) can be configured to increase fan speed as a precaution until the error is corrected. In another example, the monitor card 311 (via system controller 312) can be configured to monitor replacement of fan trays 306. Although, replacement of fan trays 306 can be performed relatively quickly, in most cases there is a finite amount of time that less than all the fan trays 306, across the computer system 300 or a fan zone 320, will be available. Thus, as a precautionary action, the monitor card 311 can be configured to temporarily run the fans 308 in the remaining ones of fan trays 306 with a higher duty cycle to provide additional cooling. Thereafter, the monitor card 311 (via system controller 312) can be configured to reduce the duty cycle, since the missing one of fan trays 306 has been replaced.

As noted above, in some cases it may be useful to detect whether a particular fan is installed or operating. Accordingly, in some embodiments, the fans can generate signals indicating their status. This is shown in FIG. 4A.

Figure 4A:
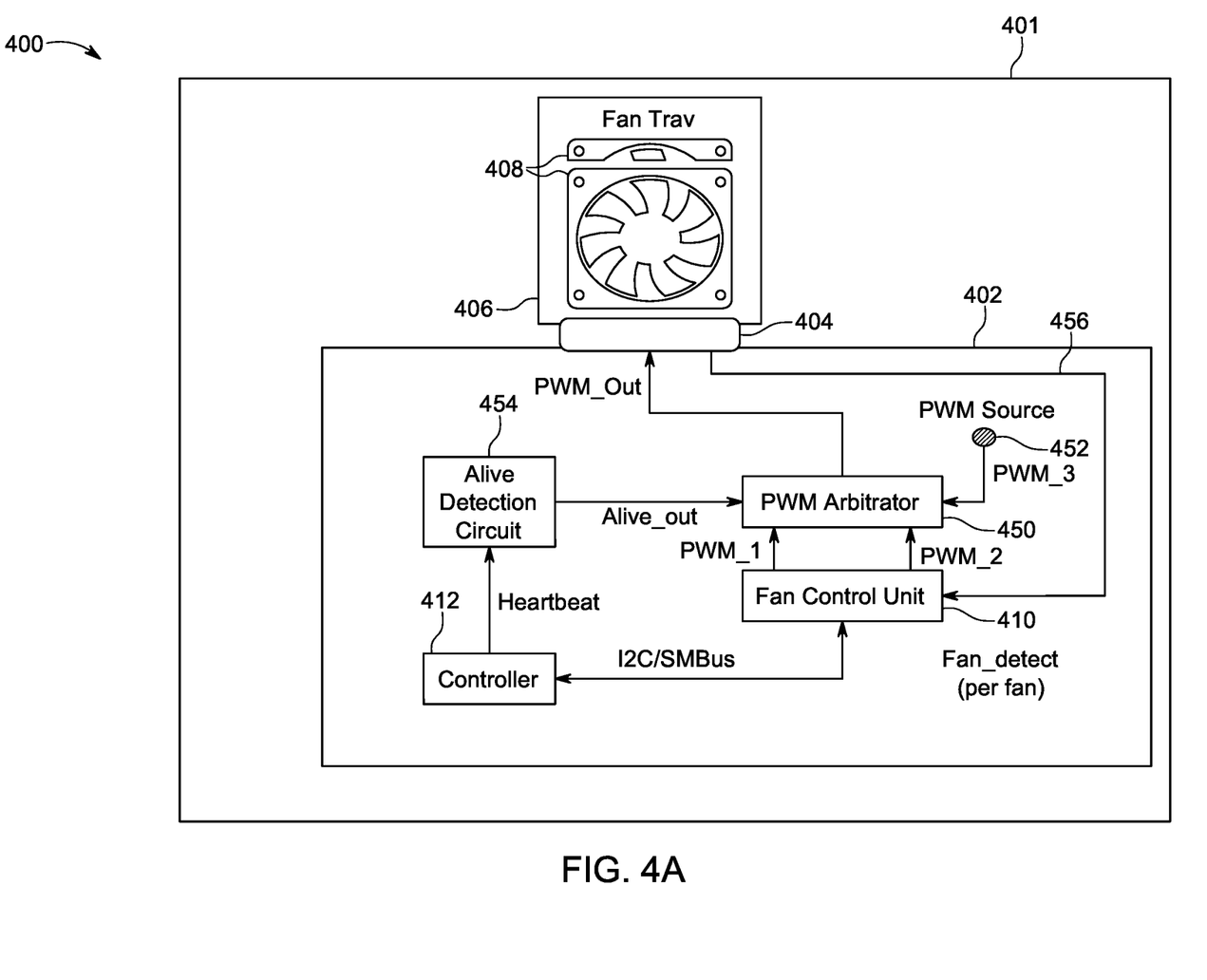
FIG. 4A is an illustration of a computer system incorporating a fan-based cooling system with hardware-based control in accordance with the various embodiments.

FIG. 4A is an illustration of a computer system 400 incorporating a fan-based cooling system with hardware-based control in accordance with the various embodiments. The configuration of system 400 in FIG. 4A is substantially similar to the configuration of system 200 in FIG. 2. Accordingly, the description of the components 201-254 shown in FIG. 2 is sufficient for describing the components 401-454 in FIG. 4A, except where noted below. Additionally, system 400 may include additional components, buses, and circuits to provide interconnection of the various components described herein.

In addition to the components identified above, computer system 400 also includes addition communications between fans 408 and fan control unit 410. In particular, connector 404 is configured to support output of a Fan_detect signal generated by each operable fan 408 in fan tray 406. Main board 402 can then include a fan status bus 456 over which the Fan_detect signals can be transmitted to the fan control unit 410. In some embodiments fan status bus 456 can be a separate independent bus. In other embodiments, the fan status bus 456 can be configured to communicate with the fan control unit 410 via the I2C/SMBus. In operation, for each one of fan 408 present and operable, a Fan_detect signal can be transmitted to the fan control unit 410. In this way, the fan control unit 410 can be aware at all time of the number and status of the fans 408 in tray 406. Moreover, this can be used to control the fan control unit 410. That is, if one or more fans are not detected as present and operable, the fan control unit 410 can generate an error signal. Alternatively, the fan control unit 410 can go into an idle mode, since there are presumable no fans to control. In turn, downstream components (e.g., arbitrator circuit 450) may also be idled or receive an error signal to cause appropriate action to be taken.

In some configurations, if the arbitrator circuit 450 is configured correctly, the feedback along bus 456 can be used as a part of mechanism in computer system 400 to protect the computer system 400 from thermal issues due to fan failures or failures of other components. This is described in detail with respect to FIG. 4B.

Figure 4B:
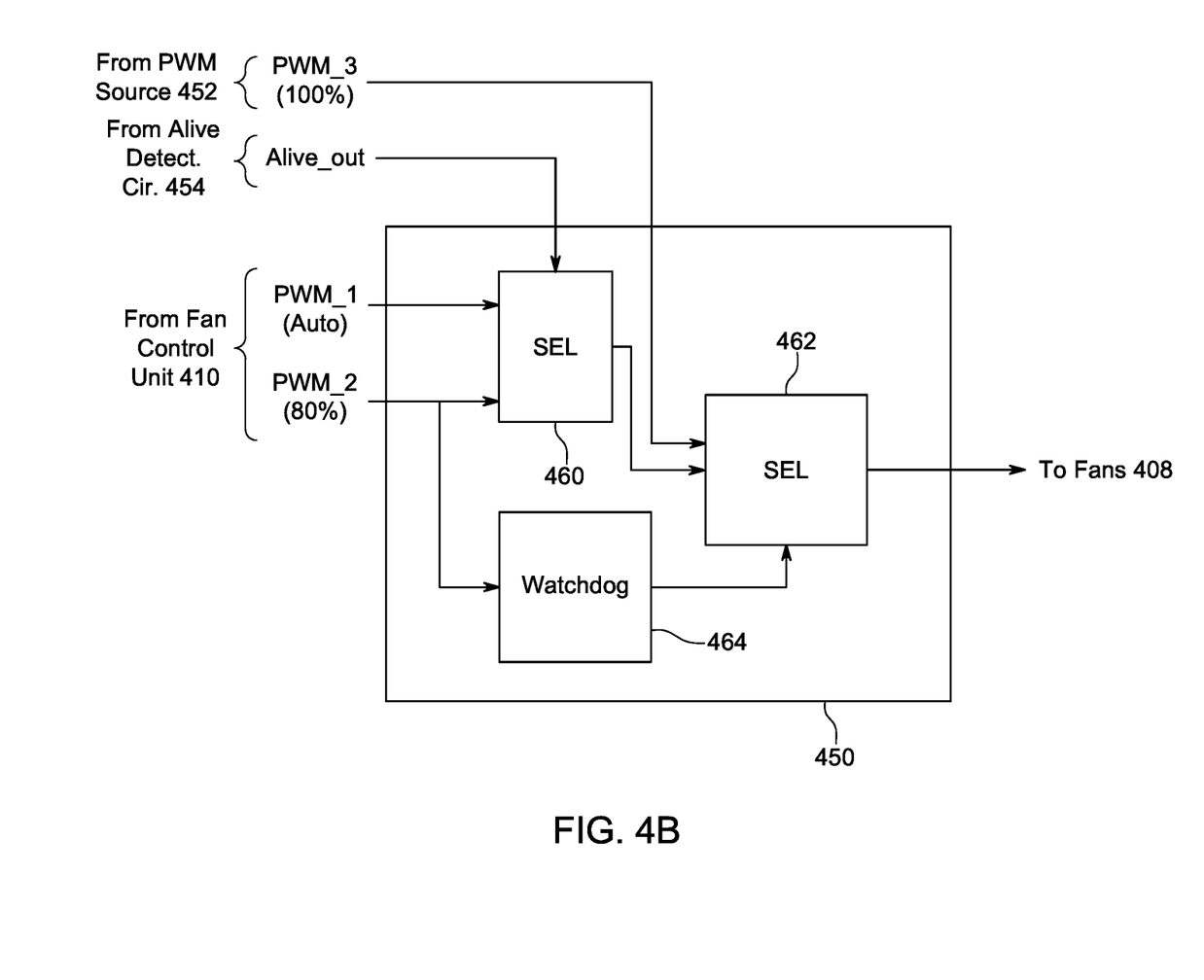
FIG. 4B shows a block diagram of one configuration for arbitrator circuit 450 in accordance with an embodiment.

FIG. 4B shows a block diagram of one configuration for arbitrator circuit 450 in accordance with an embodiment. As shown in FIG. 4B, arbitrator circuit 450 includes a first select (SEL) circuit 460, a second SEL circuit 462, and a watchdog circuit 464.

The watchdog circuit 464 is configured to monitor the PWM_2 signal from fan control unit 410. Thus if the PWM_2 signal is abnormal or missing, watchdog circuit 464 changes its output signal. Thus, the output signal of watchdog circuit 464 can be used to monitor the status of fan control unit 410.

The first SEL circuit 460 is configured to select between two input signals based on a control signal. In the first SEL circuit 460, the two input signals consist of PWM_1 and PWM_2 generated by fan control unit 410. The control signal consists of the Alive_out signal from alive detection circuit 454. Thus, first SEL circuit 460 is configured to select between PWM_1 and PWM_2 based on the status of the alive detection circuit 454, which in turn relies on the status of controller 412.

The second SEL circuit 462 is also configured to select between two input signals based on a control signal. In the second SEL circuit 462, the two input signals consist of PWM_3 and the output of the first SEL circuit 460. The control signal consists of the output signal from watchdog circuit 464. Thus, second SEL circuit 462 is configured to select between PWM_3 and the output of first SEL circuit 460 based on the status of the fan control unit 410.

This configuration can therefore be used to monitor the status of fan control unit 410, controller 412, and fans 408. Based this status, action can be taken to ensure proper cooling of computer system 400.

In a first scenario, when fan control unit 410, controller 412, and fans 408 are all present and available, the duty cycle for fans 408 would be controlled automatically based on load, temperature, or any other parameters that might affect cooling needs. In this case, the first SEL circuit 460 is configured to receive the normal Alive_out signal (indicating controller 412 is functioning) and, based on this signal, select PWM_1. In these embodiments, the fan control unit 410 can be configured to generate the PWM_1 signal according to the above-mentioned cooling parameters. Further, the fan control unit 410 can be configured for a default or standard output signal at PWM_2, The watchdog circuit 464 can detect this standard or default signal and generate an output signal so as to instruct SEL circuit 462 to pass the output of first SEL circuit 460 (PWM_1) instead of PWM_3.

In a second scenario, the controller 412 may be inoperable or otherwise not functioning properly, but the fan control unit 410 is operating normally. In such a scenario, the normal Alive_out signal is not present. As a result, the first SEL circuit 460 selects to pass PWM_2 instead of PWM_1. In such configurations, since there is a potential for thermal issues when controller 410 is malfunctioning, the duty cycle for fans 408 can be elevated as a precautionary matter. Accordingly, a high, fixed duty cycle can be used for fan 408 can be used. For example, as shown in FIG. 4B, PWM_2 can be configured as an 80% duty cycle signal. However, the duty cycle can vary from system to system according to cooling requirements. Further, since the fan control unit 410 is operable, the default or standard output signal is provided at PWM_2, Accordingly, the watchdog circuit 464 can detect this standard or default signal and generate an output signal so as to instruct SEL circuit 462 to pass the output of first SEL circuit 460 (PWM_2) instead of PWM_3.

In a third scenario, both the controller 412 and the fan control unit 410 may be inoperable or otherwise not functioning properly. In such configurations, since there is an even greater potential for thermal issues, the duty cycle for fans 408 can be elevated as much as possible as a precautionary matter. Accordingly, a highest, fixed duty cycle available can be used for fans 408. For example, as shown in FIG. 4B, PWM_3 can be configured as an 100% duty cycle signal. However, the highest available duty cycle can vary from system to system according to cooling requirements. In such a scenario, the output of second SEL circuit 464 should be PWM_3. This is provided by the watchdog circuit. In particular, since the fan control unit 410 is inoperable, the default or standard output signal is not provided at PWM_2. Accordingly, the watchdog circuit 464 can detect this error and generate an output signal so as to instruct SEL circuit 462 to pass PWM_3 as the output.

In a fourth scenario, other types of errors can occur. In some embodiments, errors signals from such errors can be routed to fan control unit 410 or can be routed to components controlling or affecting the operation of fan control unit 410. In such configurations, since there is great potential for thermal issues, the duty cycle for fans 408 can be elevated as much as possible as a precautionary matter. Accordingly, a highest, fixed duty cycle available can be used for fans 408. For example, as shown in FIG. 4B, PWM_3 can be configured as an 100% duty cycle signal. However, the highest available duty cycle can vary from system to system according to cooling requirements. In such a scenario, the output of second SEL circuit 464 should be PWM_3. This is provided by the watchdog circuit. In particular, since the fan control unit 410 is inoperable, the default or standard output signal is not provided at PWM_2. Accordingly, the watchdog circuit 464 can detect this error and generate an output signal so as to instruct SEL circuit 462 to pass PWM_3 as the output.

Figure 5A:
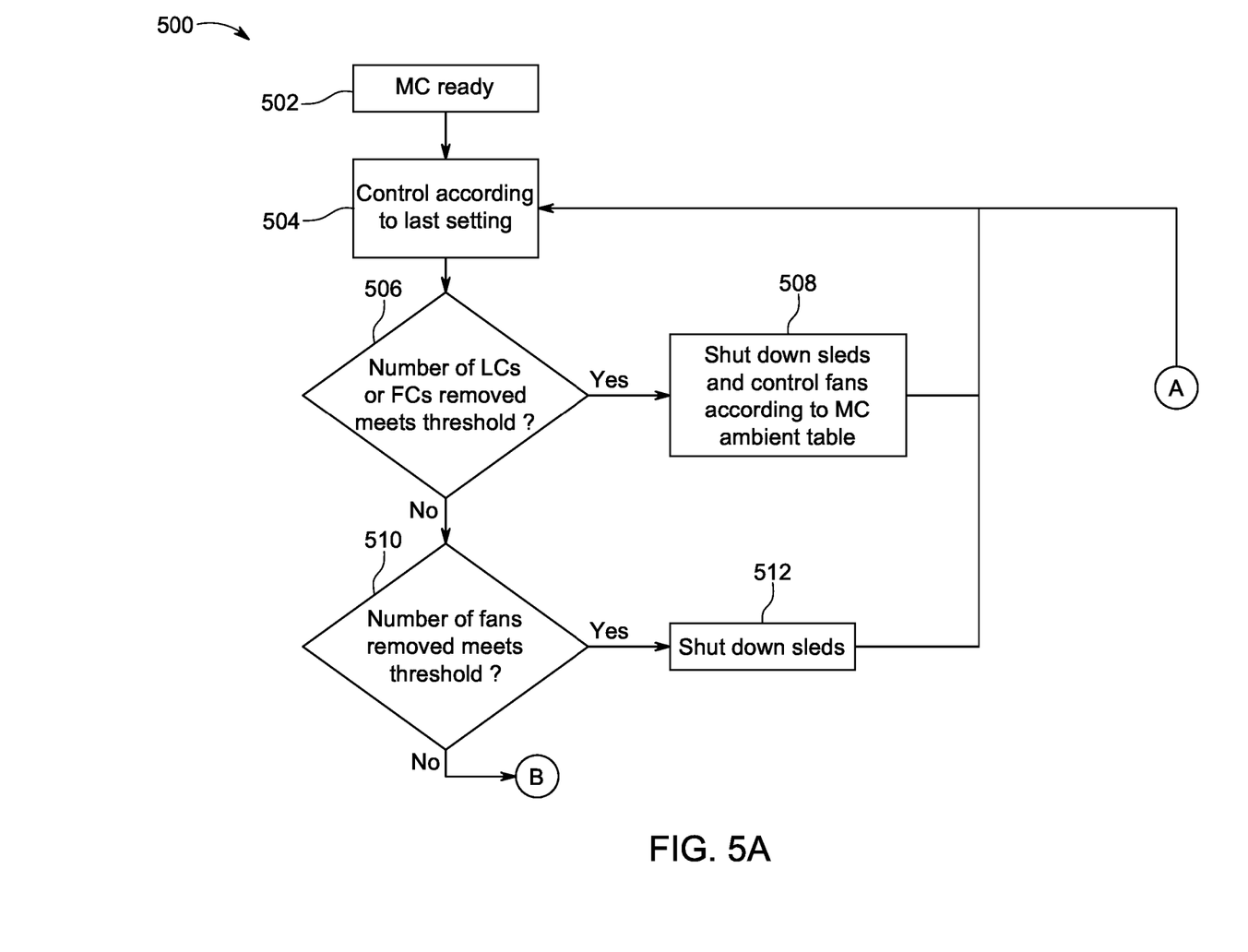
FIGS. 5A and 5B show a flowchart of steps in an exemplary method carried out by a system controller in a monitor card, such as system controller in FIG. 3.
Figure 5B:
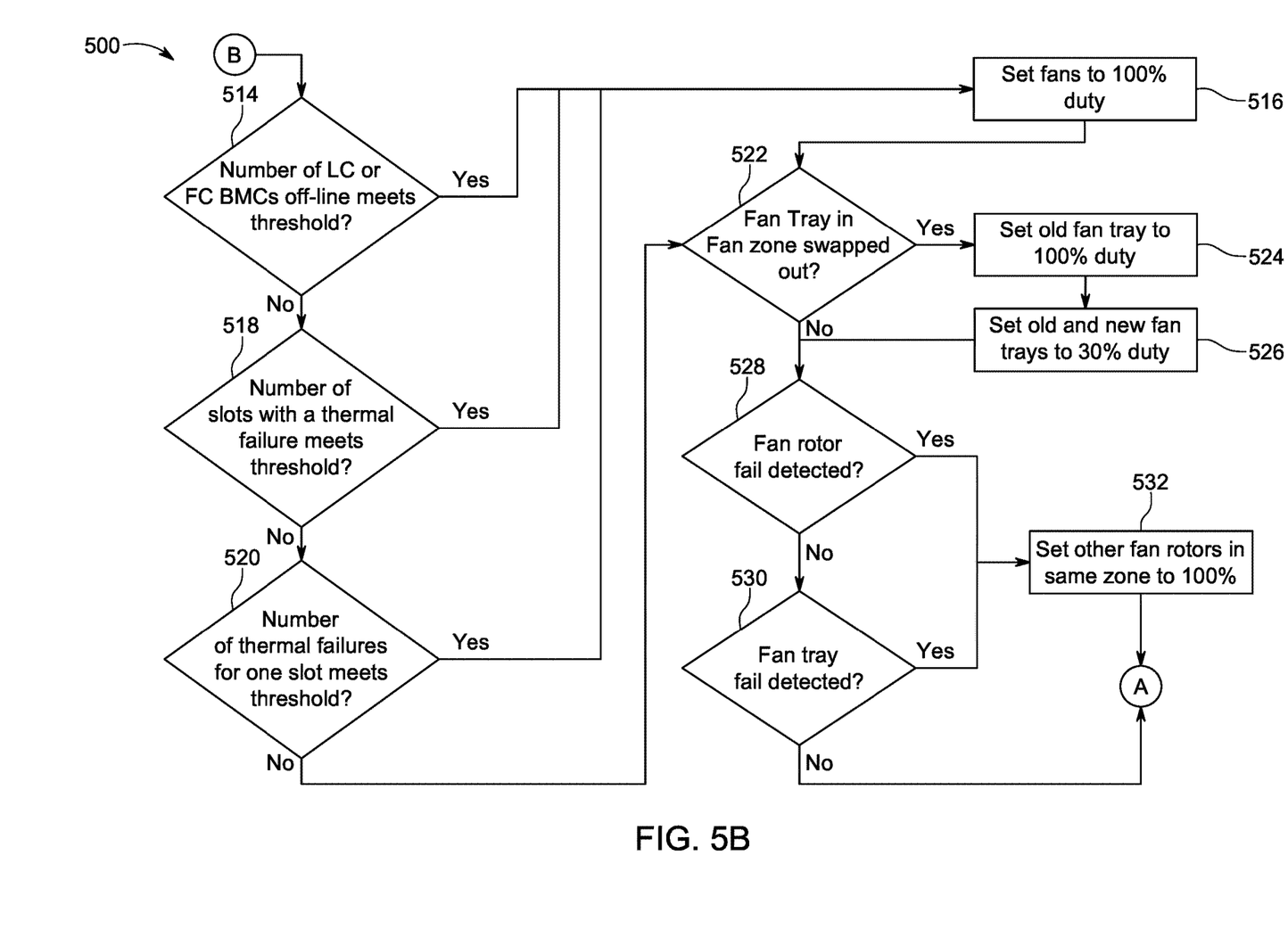

FIGS. 5A and 5B present a flowchart of steps in an exemplary method 500 carried out by a system controller in a monitor card, such as system controller 312 in one of more of monitor cards 311 in FIG. 3. For ease of illustration, the steps of method 500 in FIGS. 5A and 5B are presented in terms of a system controller in a monitor card of a switch system. That is, referring to FIG. 3, sleds 350 would be switch line cards, or sleds and switch fabric cards, or sleds.

Referring now to FIG. 5A, the method 500 begins at step 502 with the monitor card (MC) being in a ready state. For example, as discussed above, the monitor card 311 in FIG. 3 can be hot-swappable. Accordingly, step 502 of FIG. 5A can involve the monitor card 311 of FIG. 3 being powered up and the integrated system controller 312 being initialized for operation.

At step 504 in FIG. 5A, fans are controlled according to a last setting. For example, referring to FIG. 3, fans 308 in a fan zone 320 can be controlled according to a fan setting passed to the monitor card 311 (and the system controller 312) by another of monitor cards 311. In another example, a default fan setting at the system controller 312 can be used.

At step 506 in FIG. 5A, it is determined whether a number of missing components meets a threshold for taking precautionary action. For example, referring to FIG. 3, a system controller 312 can monitor the sleds 350 and determine how many are missing. As noted above, when components are missing, proper airflow may not be provided and could result in overheating and damage. In some cases, the number of missing components can be determined by component type.

For example, step 506 in FIG. 5A can involve determining a number of missing switch line cards and a number of missing switch fabric cards in a switch system. Thereafter, the numbers of missing card types are compared to thresholds for each card type. In the event a threshold is met, the method can proceed to step 508, else the method proceeds to step 510.

At step 508 in FIG. 5A, a system controller can take precautionary action to prevent damage when a threshold number of components are missing. For example, the switch line cards and the switch fabric cards in a switch system may all be shut down to prevent any possible damage to these components. Thereafter, the method returns to step 504, to repeat steps 506 and 508 until the number of missing components falls under the threshold.

At step 510 in FIG. 5A, it is determined whether a number of missing fans meets a threshold for taking precautionary action. For example, referring to FIG. 3, a system controller 312 can monitor the fan trays 306 and determine how many are missing. As noted above, when fan trays are missing, proper airflow may not be provided and could result in overheating and damage. In the event a threshold is met, the method can proceed to step 512. Otherwise, the method proceeds to step 514 in FIG. 5B.

At step 512 in FIG. 5A, a system controller can take precautionary action to prevent damage when a threshold number of fans are missing. For example, the switch line cards and the switch fabric cards in a switch system may all be shut down to prevent any possible damage to these components. Thereafter, the method returns to step 504, potentially repeating steps 510 and 512 until the number of missing fans falls under the threshold.

At step 514 in FIG. 5B, the management controller status of the components is evaluated. In particular, step 514 involves determining whether a threshold number of the management controllers associated with the components have failed, or are otherwise offline. For example, referring to FIG. 3, one of system controllers 312 can determine a number of the MCs 352 associated with the sleds 350 have failed and compare that number to a threshold number. If the threshold number is met, the method 500 can proceed to step 516. Otherwise the method proceeds to step 518.

At step 518 in FIG. 5B, the thermal failures across the computer system are evaluated. In particular, step 518 involves determining whether the threshold number of times a high temperature exceeding a threshold temperature has occurred across all components. For example, referring to FIG. 3, one of system controllers 312 can determine a number of thermal failures across all of the sleds 350 and compare that number to a threshold number. If the threshold number is met, the method 500 can proceed to step 516. Otherwise the method proceeds to step 520.

At step 520 in FIG. 5B, the thermal failures in a particular component are evaluated. In particular, step 520 involves determining whether a threshold number of times a high temperature exceeding a threshold temperature has occurred in a single component. For example, referring to FIG. 3, one of system controllers 312 can determine a number of thermal failures in one of the sleds 350 and compare that number to a threshold number. If the threshold number is met, the method 500 can proceed to step 516. Otherwise the method proceeds to step 522.

At step 516 in FIG. 5B, a system controller can take precautionary action to prevent damage when any of the conditions in steps 514, 518, or 520 are met. For example, as shown in FIG. 5B, the fans in a computer system can be set to 100% duty cycle to prevent any possible thermal damage. However, another elevated fan duty (relative to a regular fan duty) can be selected instead. Thereafter, the method continues to step 522, potentially repeating any of steps 514-520 until the number of management controller failures and thermal failures fall under the corresponding thresholds.

At step 522 in FIG. 5B, a system controller can monitor its corresponding fan zone for the hot-swapping of fan trays. As noted above with respect to FIG. 3, the hot-swapping of fan trays 306 can result in disruption in ventilation. Thus, a system controller 312 associated with a fan zone 320, associated with the swapped fan tray 306, can take precautionary actions to prevent overheating and damage in computer system 300. Accordingly, step 522 of FIG. 5B involves determining whether a hot-swap of a fan tray has occurred. In the case that such a hot swap has occurred, the method 500 can proceed to step 524. Otherwise the method proceeds to step 528.

At step 524 in FIG. 5B, the system controller can first take precautionary action. In particular, the system controller can increase duty cycle for all fans in the zone associated with the missing fan tray. For example, as shown in FIG. 5B, the fan duty can be set to 100%. However, another elevated fan duty (relative to a regular fan duty) can be selected instead. The method then proceeds to step 526.

At step 526 in FIG. 5B, the system controller can take recovery action. In particular, the system controller can reduce the previously elevated duty cycle for all fans in the affected fan zone. For example, as shown in FIG. 5B, the fan duty can be set to at least 30% for all fan trays. However, another reduced fan duty (relative to the fan duty in step 524) can be selected instead. In some implementations, step 526 is triggered when a new fan tray is inserted. In other implementations, step 526 may be triggered after a certain amount of time has elapsed, based on the assumption of the minimum time required to replace the fan tray. The method then proceeds to step 528.

At step 528 in FIG. 5B, the system controller can monitor for individual fan failures. For example, referring to FIG. 3, a system controller 312 associated with one of zones 320 can monitor for failures of rotors in each of fans 308 in the one of the zones 320. However, step 528 can involve detection of any other type of individual fan failures. If such failures are detected, method 500 can proceed to step 532. Otherwise method 500 proceeds to step 530.

At step 530 in FIG. 5B, the system controller can monitor for fan tray failures. For example, referring to FIG. 3, a system controller 312 associated with one of zones 320 can monitor for failures of fan trays 306 in the one of the zones 320. If such failures are detected, method 500 can proceed to step 532. Otherwise method 500 proceeds to step 504 in FIG. 5A.

At step 532 in FIG. 5B, a system controller can take precautionary action to prevent damage when fans or fan trays in a particular zone have failed. For example, as shown in FIG. 5B, the fans in an affected zone can be set to 100% duty cycle to prevent any possible thermal damage. However, another elevated fan duty (relative to a regular fan duty) can be selected instead. Thereafter, the method continues to step 504 in FIG. 5A, potentially repeating any of steps 528-530 until other fan or fan tray failures are detected.

As noted above, the exemplary computer systems in FIGS. 2, 3, 4A, and 4B can include more or less components than shown. Example systems and networks, as disclosed with respect to FIGS. 6 and 7, describe some of these components. Therefore the discussion below describes some potential variations for the various embodiments.

Figure 6:
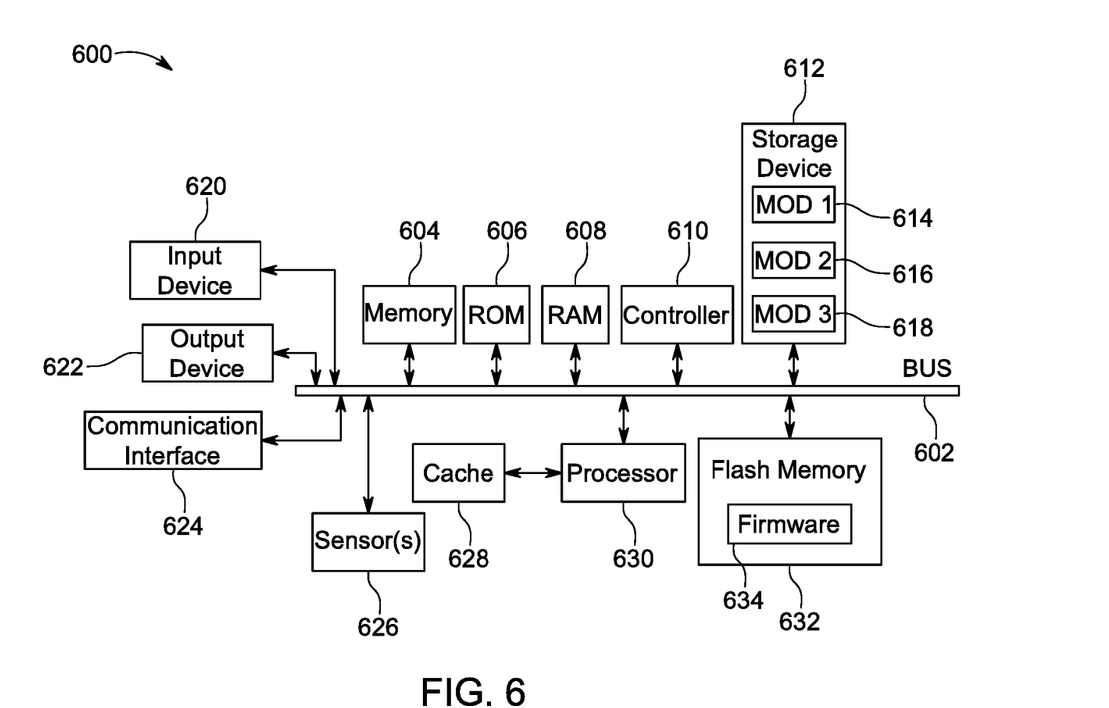
FIG. 6 illustrates an example computing system in which components of the computing system are in electrical communication with each other.

FIG. 6 shows an example computing system 600, in which components of the computing system are in electrical communication with each other using a bus 602. The system 600 includes a processing unit (CPU or processor) 630, and a system bus 602 that couples various system components, including the system memory 604 (e.g., read only memory (ROM) 606 and random access memory (RAM) 608, to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for processor 630 while waiting for data. These and other modules can control or be configured to control the processor 630 to perform various actions. Other system memory 604 may be available for use as well. The memory 604 can include multiple different types of memory with different performance characteristics. The processor 630 can include any general purpose processor and a hardware module or software module, such as module 1 614, module 2 616, and module 3 618 embedded in storage device 612. The hardware module or software module is configured to control the processor 630, as well as a special-purpose processor where software instructions are incorporated into the actual processor design. The processor 630 may essentially be a completely self-contained computing system, containing multiple cores or processors, a bus, memory controller, cache, etc. A multi-core processor may be symmetric or asymmetric.

To enable user interaction with the computing device 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the system 600. In this example, an output device 622 is also provided. The communications interface 624 can govern and manage the user input and system output.

Storage device 612 can be a non-volatile memory to store data that is accessible by a computer. The storage device 612 can be magnetic cassettes, flash memory cards, solid state memory devices, digital versatile disks, cartridges, random access memory (RAM) 608, read only memory (ROM) 606, and hybrids thereof.

The controller 610 can be a specialized microcontroller or processor on the system 600, such as a BMC (baseboard management controller). In some cases, the controller 610 can be part of an Intelligent Platform Management Interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event log controller and/or storage for managing and maintaining events, alerts, and notifications received by the controller 610. For example, the controller 610 or a system event log controller can receive alerts or notifications from one or more devices and components, and maintain the alerts or notifications in a system event log storage component.

Flash memory 632 can be an electronic non-volatile computer storage medium or chip that can be used by the system 600 for storage and/or data transfer. The flash memory 632 can be electrically erased and/or reprogrammed. Flash memory 632 can include EPROM (erasable programmable read-only memory), EEPROM (electrically erasable programmable read-only memory), ROM, NVRAM, or CMOS (complementary metal-oxide semiconductor), for example. The flash memory 632 can store the firmware 634 executed by the system 600 when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 634 can recognize, initialize, and test hardware present in the system 600 based on the set of configurations. The firmware 634 can perform a self-test, such as a POST (Power-on-Self-Test), on the system 600. This self-test can test the functionality of various hardware components, such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the system 600 can include a firmware configuration that defines how the firmware 634 controls various hardware components in the system 600. The firmware configuration can determine the order in which the various hardware components in the system 600 are started. The firmware 634 can provide an interface, such as an UEFI, that allows a variety of different parameters to be set, which can be different from parameters in a firmware default configuration. For example, a user (e.g., an administrator) can use the firmware 634 to specify clock and bus speeds; define what peripherals are attached to the system 600; set monitoring of health (e.g., fan speeds and CPU temperature limits); and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

System 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general purpose output (GPO), and the like. Different types of sensors (e.g., sensors 626) on the system 600 can also report to the controller 610 on parameters, such as cooling fan speeds, power status, operating system (OS) status, hardware status, and so forth.

Figure 7:
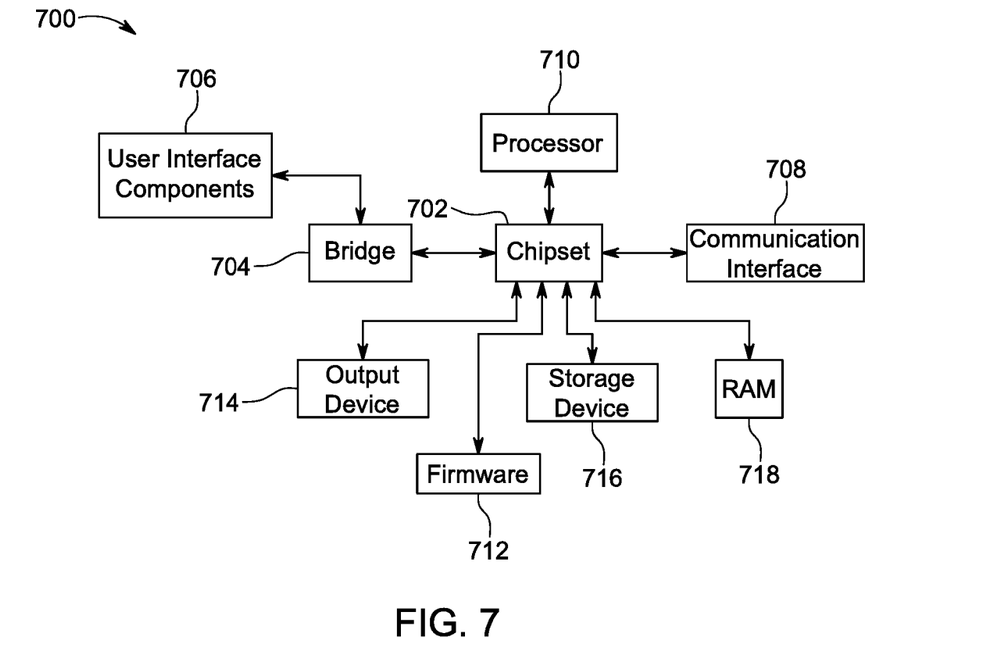
FIG. 7 illustrates an example computer system having a chipset architecture that can be used in executing the described method(s) or operations, and generating and displaying a graphical user interface (GUI).

FIG. 7 illustrates an example computer system 700 having a chipset architecture that can be used in executing the described method(s) or operations, and generating and displaying a graphical user interface (GUI). Computer system 700 can include computer hardware, software, and firmware that can be used to implement the disclosed technology. System 700 can include a processor 710, representative of a variety of physically and/or logically distinct resources capable of executing software, firmware, and hardware configured to perform identified computations. Processor 710 can communicate with a chipset 702 that can control input to and output from processor 710. In this example, chipset 702 outputs information to output device 714, such as a display, and can read and write information to storage device 716. The storage device 716 can include magnetic media, and solid state media, for example. Chipset 702 can also read data from and write data to RAM 718. A bridge 704 for interfacing with a variety of user interface components 706, can be provided for interfacing with chipset 702. User interface components 706 can include a keyboard, a microphone, touch detection and processing circuitry, and a pointing device, such as a mouse.

Chipset 702 can also interface with one or more communication interfaces 708 that can have different physical interfaces. Such communication interfaces can include interfaces for wired and wireless local area networks, for broadband wireless networks, and for personal area networks. Further, the machine can receive inputs from a user via user interface components 706, and execute appropriate functions, such as browsing functions by interpreting these inputs using processor 710.

Moreover, chipset 702 can also communicate with firmware 712, which can be executed by the computer system 700 when powering on. The firmware 712 can recognize, initialize, and test hardware present in the computer system 700 based on a set of firmware configurations. The firmware 712 can perform a self-test, such as a POST, on the system 700. The self-test can test the functionality of the various hardware components 702-718. The firmware 712 can address and allocate an area in the memory 718 to store an OS. The firmware 712 can load a boot loader and/or OS, and give control of the system 700 to the OS. In some cases, the firmware 712 can communicate with the hardware components 702-710 and 714-718. Here, the firmware 712 can communicate with the hardware components 702-710 and 714-718 through the chipset 702, and/or through one or more other components. In some cases, the firmware 712 can communicate directly with the hardware components 702-710 and 714-718.

It can be appreciated that example systems in FIGS. 6 and 7 can have more than one processor, or be part of a group or cluster of computing devices networked together to provide greater processing capability.

For clarity of explanation, in some instances, the present disclosure may be presented as including individual functional blocks, including functional blocks, devices, and/or device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources that are used can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executed in a single device, by way of further example.

The various examples can be further implemented in a wide variety of operating environments, which in some cases can include one or more server computers, user computers, or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with one, or a combination of, the following technologies: a discrete logic circuit(s) having logic gates for implementing logic functions upon data signals; an application specific integrated circuit (ASIC) having appropriate combinational logic gates; programmable hardware such as a programmable gate array(s) (PGA); a field programmable gate array (FPGA); etc.

Most examples utilize at least one network that would be familiar to those skilled in the art for supporting communications using a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods according to these technologies, can include hardware, firmware, and/or software; and can take a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run a variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java, C, C # or C++; or any scripting language, such as Perl, Python or TCL; as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including storage media and computing media. The storage media and computing media can include, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices. The removable and non-removable media can be used to store the desired information that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computing device comprising:
a system controller configured to generate a control signal that includes an operational status of the system controller;
a fan control unit communicatively coupled to the system controller, the fan control unit being configured to
receive the control signal from the system controller,
generate a first fan control signal based on the control signal,
receive data that is independent from the control signal received from the system controller, the data excluding the operational status of the system controller, and
generate a second fan control signal autonomously based on the data;
a fan connector;
an arbitrator circuit communicatively coupling the fan control unit to the fan connector, the arbitrator circuit being configured to
monitor the operational status of the system controller,
determine if the operational status of the system controller is a normal operation or an abnormal operation,
select the first fan control signal as a final control signal if the operational status of the system controller is the normal operation,
select the second fan control signal as the final control signal if the operational status of the system controller is the abnormal operation, and
provide to the fan connector the final control signal based on the operational status of the system controller; and
a status detection circuit, wherein the system controller transmits an initial operational status signal to the status detection circuit, wherein the status detection circuit generates a final operational status signal for the arbitrator circuit, and wherein the arbitrator circuit determines the operational status of the system controller based on the final operational status signal.

2. The computing device of claim 1, wherein the arbitrator circuit is configured to receive a third fan control signal, wherein the arbitrator circuit is configured to monitor an operational status of the fan control unit, and select the third fan control signal as the final fan control signal when the operational status of the fan control unit is abnormal.

3. The computing device of claim 1, wherein the system controller generates an operational status signal for the arbitrator circuit, and wherein the arbitrator circuit determines the operational status of the system controller based on the operational status signal.

4. The computing device of claim 1, wherein the final operational status signal is a heartbeat signal or an alive signal.

5. The computing device of claim 1, wherein the final fan control signal is a pulse-width modulation (PWM) signal.

6. The computing device of claim 1, wherein the data received by the fan control unit is at least one temperature, the second fan control signal being generated based on the at least one temperature.

7. A computer-implemented method for controlling a fan in a computing device, comprising:
ascertaining an operational status of a system controller, the operational status being one of a normal status or an abnormal status;
if the operational status of the system controller is the normal status, controlling the fan using a first fan control signal generated at a fan control unit based on a control signal from the system controller;
if the operational status of the system controller is the abnormal status, controlling the fan using a second fan control signal autonomously generated at the fan control unit, the second fan control signal being based on data that is independent of the control signal, the data excluding the operational status of the system controller;
transmitting, via the system controller, an initial operational status signal to a status detection circuit;
generating, via the status detection circuit, a final operational status signal for an arbitrator circuit; and
determining, via the arbitrator circuit, the operational status of the system controller based on the final operational status signal.

8. The computer-implemented method of claim 7, wherein the data is based on at least one temperature.

9. The computer-implemented method of claim 7, further comprising:
detecting an operational status of the fan control unit to be an abnormal status; and
upon detecting that the operational status of the fan control unit is the abnormal status, controlling the fan using a third fan control signal generated outside of the fan control unit.

10. The computing device of claim 7, further comprising:
receiving a heartbeat signal from the system controller; and
determining the operational status of the system controller based on the heartbeat signal.

* * * * *